United States Patent [19]
Fischell

[11] 3,767,139
[45] Oct. 23, 1973

[54] SPACECRAFT SPIN STABILIZATION SYSTEM

[75] Inventor: Robert E. Fischell, Silver Spring, Md.

[73] Assignee: The United States of America as represented by the Secretary of the Navy

[22] Filed: June 21, 1971

[21] Appl. No.: 155,071

[52] U.S. Cl. .............................. 244/1 SA, 244/3.21
[51] Int. Cl. ............................................. B64g 1/10
[58] Field of Search ................ 244/1 SA, 1 SS, 3.2, 244/3.23, 3.21; 74/5.1, 572

[56] References Cited
UNITED STATES PATENTS

| | | | |
|---|---|---|---|
| 3,296,886 | 1/1967 | Reinhart | 74/572 |
| 3,429,524 | 2/1969 | Buckingham et al. | 244/1 SA |
| 3,473,391 | 10/1969 | Williamson et al. | 74/5.1 |
| 3,489,372 | 1/1970 | Ellis et al. | 244/1 SA |
| 3,511,452 | 5/1970 | Smith et al. | 244/1 SA |
| 3,637,169 | 1/1972 | Tossman et al. | 244/1 SA |

*Primary Examiner*—Trygve M. Blix
*Assistant Examiner*—Barry L. Kelmachter
*Attorney*—R. S. Sciascia et al.

[57] ABSTRACT

An angular momentum flywheel is mounted aboard a satellite or similar spacecraft to permit spin stabilization of the satellite without imposing undue limitations on the spin rate of the outer or main satellite body. The flywheel generates an angular momentum which can be utilized on slowly spinning satellites to increase the net angular momentum of the system and thus insure spin stabilization of the satellite or can be utilized on rapidly spinning satellites to decrease the net angular momentum and thus facilitate adjustments in the attitude of the satellite spin axis.

10 Claims, 3 Drawing Figures

Patented Oct. 23, 1973 3,767,139

INVENTOR.
ROBERT E. FISCHELL
BY
J. J. Cooke

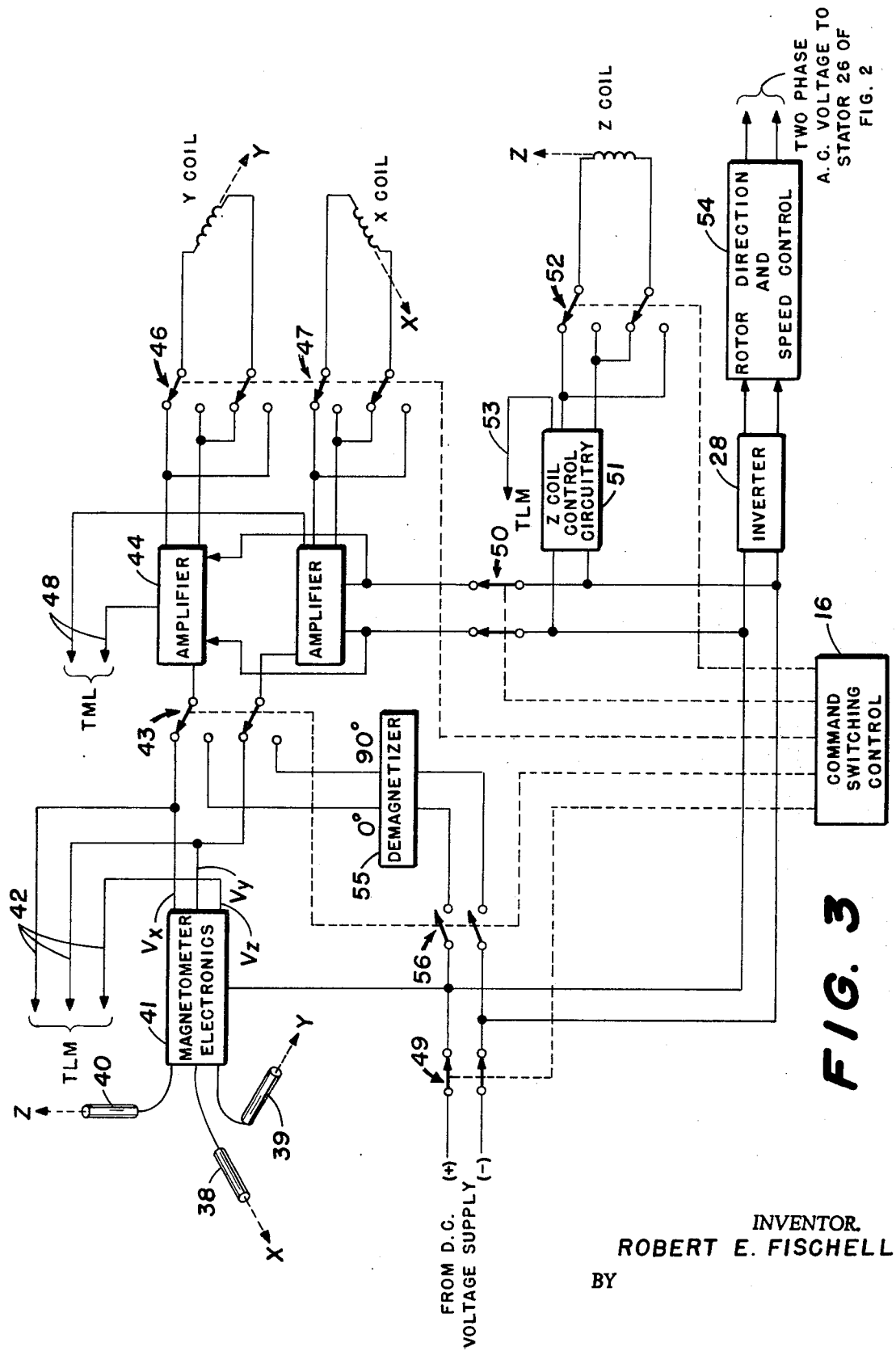

SPACECRAFT SPIN STABILIZATION SYSTEM

BACKGROUND OF THE INVENTION

Satellites are often employed to carry sensing devices or detectors into orbit about the Earth for the purpose of measuring and classifying various components constituting the Earth's atmosphere and/or for diverse other purposes. To insure optimum results from such satellite missions, it is necessary to control the satellite orientation so as to maintain a predetermined attitude in space.

One of the simplest and most reliable attitude control systems for such an Earth satellite consists of fixing the position of one satellite axis by means of gyroscopic torques resulting from angular momentum about that axis. Various spin control systems have been previously proposed for causing a satellite to spin at a desired rate. For example, rockets or cold gas jets have been utilized but obviously require extra fuel aboard the satellite and also normally involve the use of moving parts. Alternatively, it has been previously proposed that a magnetic spin control system can be utilized whereby a magnetic dipole moment is generated aboard the satellite to interact with the geomagnetic field and to spin up the satellite and thereby maintain the necessary stabilizing gyroscopic torques. One such magnetic spin control system is disclosed in the U.S. Patent issued to Richard T. Ellis and Robert E. Fischell, No. 3,489,372, dated Jan. 13, 1970, and has been utilized, for example, on the AE-B and DME-A satellites launched by NASA. This previously proposed magnetic spin control system also utilizes a chargeable magnet mounted in alignment with the spin or Z-axis of the satellite to produce a dipole moment which interacts with the Earth's magnetic field and causes a precessional motion of the satellite spin axis. The energization of this chargeable magnet can be controlled either by separate on/off commands transmitted from the earth control station(s), as were utilized on the DME-A satellite, or by means of a programmer unit aboard the satellite which receives its commands from a digitial computer on the ground to control the energization of the spin axis chargeable magnet as necessary to precess the spin axis to change its orientation to the desired attitude, as was utilized on the SAS-A satellite more recently launched by NASA.

Many orbiting spacecraft require a specified and frequently very slow spin rate. Obviously, when the satellite is spinning very slowly there is only an exceedingly weak gyroscopic restoring moment which, in turn, can cause the spin axis orientation to be very easily disturbed by small perturbing torques such as those arising from the gravity-gradient or aerodynamic force fields. In such a situation it is thus desirable to increase the net stabilizing angular momentum of the system without requiring an increase in spacecraft spin rate. On the other hand, on large or rapidly spinning satellite it may, at times, be quite desirable to decrease the over-all or net angular momentum (but not to zero) so that the orientation of the spin axis of the satellite may more readily be adjusted.

A somewhat different attitude control system employs a counter-rotating reaction wheel attached to the satellite. Such system is typically a closed loop control system employing attitude sensors, gas jets and a reaction wheel-tachometer set. This type of system acts to cause the net angular momentum of the spinning satellite and counter-rotating reaction wheel to equal zero. The sensors provide the desired attitude change information and the precession torque is applied by cold gas jets or the like. In this attitude corrections are performed without the larger gas expenditures which would be required to precess only the spinning satellite itself. The basic technique of this type of system is to reduce the net satellite system angular momentum to zero, so that the satellite behaves as an inert, non-spinning body. A system similar to the above is described in U.S. Pat. No. 3,511,452, issued to C. L. Smith and R. H. VanVooren. However, it has been found in an open loop control system that if the net angular momentum goes to zero, the system becomes unstable and all control over the satellite system is lost, the disadvantages of this condition are obvious.

Another satellite attitude control system suitable for use on a non-spinning satellite utilizes a reaction wheel to provide necessary correction in attitude. This type of attitude control system is described in U.S. Pat. No. 3,429,524 issued to A. G. Buckingham and T. P. Haney. In this type system a reaction wheel is used to provide attitude corrections by causing the satellite to react to the actions of the wheel. To better understand such system the action-reaction event may be described by the equation:

$$\theta_w I_w = \theta_s I_s$$

where $\theta_w$ is the wheel angular displacement, $I_w$ is the wheel moment of inertia, $\theta_s$ is the resultant satellite angular displacement, and $I_s$ is the satellite moment of inertia. Typically the satellite moment of inertia ($I_s$) will be at least one thousand times greater than the wheel moment of inertia ($I_w$). Hence, in order to obtain a resultant satellite angular displacement sufficient to precess the satellite to the desired attitude, the reaction wheel must be spun or revolved a specified number of times sufficient to satisfy the above equation. However, for many application, such as astronomical observatory satellites, highly stable gyroscopic control is necessary to maintain a precise satellite attitude. This system does not provide gyroscopic attitude control, moreover, this reaction wheel system merely provides a torque necessary to precess the satellite to a desired attitude.

DESCRIPTION OF THE INVENTION

In accordance with the present invention, it is proposed to provide an angular momentum flywheel or rotor aboard a spinning spacecraft with the spin axis of the flywheel parallel with the spin axis of the spacecraft so that the angular momenta of the flywheel and spacecraft either add to or subtract from one another, as desired. Suitable nutation damping can also be provided on the spacecraft, if desired, to eliminate any wobble of the spacecraft about the spin or Z-axis.

On slowly spinning satellites, for example, the flywheel will thus furnish the stabilizing angular momentum necessary to assure a fixed orientation of the satellite spin axis in inertial space. In one such practical application of the present invention, a small angular momentum flywheel is mounted aboard a spacecraft and contains approximately 90 percent of the total angular momentum of the system. As a result, the outer or main satellite body can then be rotated at any relatively slow spin rate, (even zero) and proper attitude control for the over-all system will still be maintained due to the angular momentum provided by the flywheel. This provides gyroscopic stabilization required to maintain the precise satellite attitude necessary in observatory type satellites. An important advantage of utilizing a small angular momentum flywheel to provide the majority of the spin stabilizing angular momentum aboard a satellite, as compared to depending upon spin of the satellite body itself about a selected axis, is that the three principal moments of inertia of the satellite body containing the flywheel can then be made equal. Therefore, gravity-gradient torques all disappear and the satellite body will not be disturbed by this effect. On the other hand, bodies which contain angular momentum by spinning and do not utilize an angular momentum flywheel require that the moment of inertia along the spin axis be at least three to five percent greater than the moment of inertia about any transverse axis. As a result, the body is susceptible to gravity-gradient torques which will perturb the orientation of the spin axis. Another important advantage of utilizing an angular momentum flywheel aboard the spinning satellite is that it is then possible to change the spin of the outer satellite body from one direction to another without loss of spin rate control while going through zero angular rate for the satellite body.

As mentioned previously, the employment of an angular momentum flywheel mounted with its axis parallel to the spin axis of a satellite, as proposed in accordance with the present invention, also has application aboard large spinning satellites or on those that are required to spin at relatively high rates, for the purpose of facilitating changes in the orientation or attitude of the satellite spin axis. For example, on the NASA satellites which utilized the spin control system described in the Ellis and Fischell U.S. Pat. No. 3,489,372, a substantial amount, by weight, or chargeable magnetic material was necessary aboard the spacecraft in order to overcome the spin stabilization effect and to readily permit adjustment of the satellite's spin axis orientation in orbit. If, however, there is a counter-rotating body rigidly attached to the spinning spacecraft to appreciably decrease the net angular momentum of the system, then the amount of the chargeable magnetic material necessary aboard the spacecraft to control spin axis orientation would be greatly reduced. Accordingly, it is proposed in accordance with the present invention that the angular momentum flywheel or rotor can, when necessary, be rotated in a direction opposite to the spin of the satellite's outer body and thereby reduce the over-all or net angular momentum to a value sufficient to maintain spin stabilization but small enough to enable the spin axis orientation to be changed at a relatively fast rate, with a small chargeable control magnet.

In view of the foregoing discussion, one object of the present invention is to provide an improved spin stabilization system for satellites or the like wherein a flywheel is mounted aboard the spacecraft to generate angular momentum relative to a selected axis of the spacecraft.

A further object of the present invention is to provide a spin stabilization system wherein a rotor or angular momentum flywheel is mounted aboard a spinning spacecraft with the spin axes of the spacecraft and the flywheel parallel to one another so that the angular momentum of the flywheel adds to or subtracts from the angular momentum of the spacecraft, as desired.

A further object of the present invention is to provide a spin stabilization system wherein an angular momentum flywheel or rotor is mounted with its spin axis parallel to the spin axis of a slowly spinning satellite to provide substantial stabilizing angular momentum for the spacecraft sufficient to maintain the spin axis of the spacecraft properly oriented in inertial space.

A further object of the present invention is to provide the spin stabilization system useful on rapidly spinning or large spacecraft and comprising an angular momentum flywheel or rotor which is mounted aboard the spacecraft with its spin axis parallel to the spacecraft's spin axis but rotating in the opposite sense for the purpose of reducing the effective or net angular momentum influencing the spacecraft to a value at which the spin axis of the spacecraft is still spin-stabilized in inertial space but its orientation may more readily be changed, as desired.

Other objects, purposes and characteristic features of the present invention will in part be pointed out as the description of the present invention progresses and in part be obvious from the accompanying drawings, wherein:

FIG. 3 is a circuit diagram, partially in block form, of the control circuitry associated with the spin stabilization system of the present invention.

Figure 1:
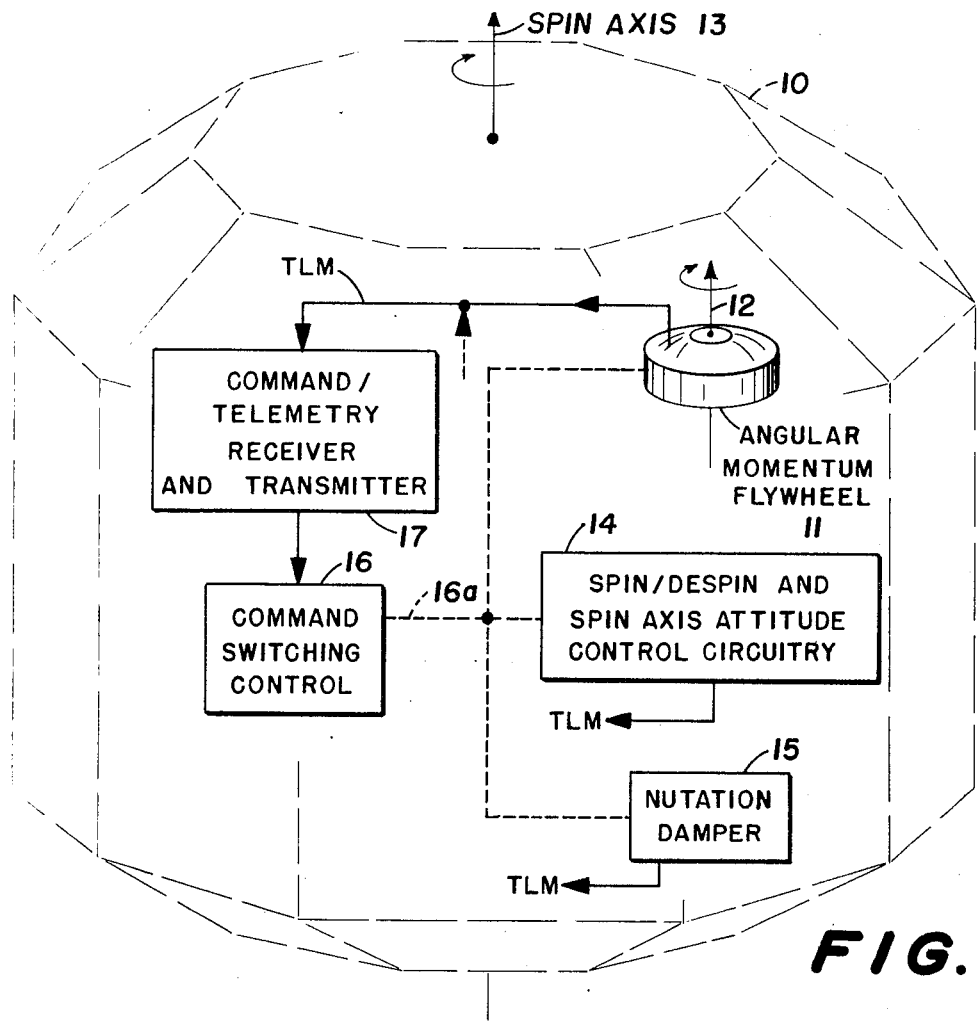
FIG. 1 is a block diagrammatic view of an overall spacecraft control system which incorporates the spin stabilization system proposed in accordance with the present invention.

Referring now to the drawings, the spin stabilization system of the present invention has application aboard many types of space vehicles such as, for example, the Earth satellite 10 shown in dotted form in FIG. 1. More specifically, the proposed spin stabilization system basically comprises an angular momentum flywheel or rotor 11 which is suitably mounted rigidly internal (or external) to the satellite so that its spin axis 12 is parallel with the spin axis 13 of the satellite. As will be explained in more detail hereinafter, the flywheel 11 is utilized to determine the net angular momentum tending to maintain the satellite spin axis 13 stabilized in inertial space as the satellite 10 orbits the Earth, for example.

Also mounted aboard the satellite 10 is a suitable magnetic spin rate control system which controls the spinning of the outer or main body of the satellite 10 independent of the angular rate of the flywheel or rotor 11, in accordance with magnetic dipole moments which are generated aboard the spacecraft and interact with the ambient geomagnetic field.

As illustrated in FIG. 1, this satellite-carried magnetic spin rate control system includes control circuitry 14, to be described in more detail hereinafter, which controls the rate and direction of spin of the satellite 10 about its spin axis 13 and also the attitude or orientation of the spin axis 13 in inertial space. One example of such a magnetic spin rate control system is described in the above-mentioned U.S. Pat. No. 3,489,372 issued to Richard T. Ellis and Robert E. Fischell. Also employed aboard the satellite 10 to eliminate any wobble of the spacecraft about its spin axis 13 is a suitable nutation damper 15 which may be of the type, for example, disclosed in the U.S. Patent application of Barry E. Tossman, Frederick F. Mobley and Robert E. Fischell, Ser. No. 848,503, now U.S. Pat. No. 3,637,169 filed Aug. 8, 1969.

The operations of the angular momentum flywheel 11, the spin/despin and spin axis attitude control circuitry 14 and the nutation damper 15 are each under the control of a suitable command switching control unit 16, as represented by the branched dotted line 16a in FIG. 1. This command switching control unit 16 is, in turn, responsive to command messages received aboard the spacecraft 10 from the controlling ground station(s) by command/telemetry receiver and transmitter unit 17 of conventional design. The unit 17 might, for example, receive its telemetry TLM input information from the flywheel 11, the control circuitry 13, and the nutation damper 14 so as to enable the ground station(s) to properly monitor the over-all performance of the proposed spin stabilization system.

Figure 2:
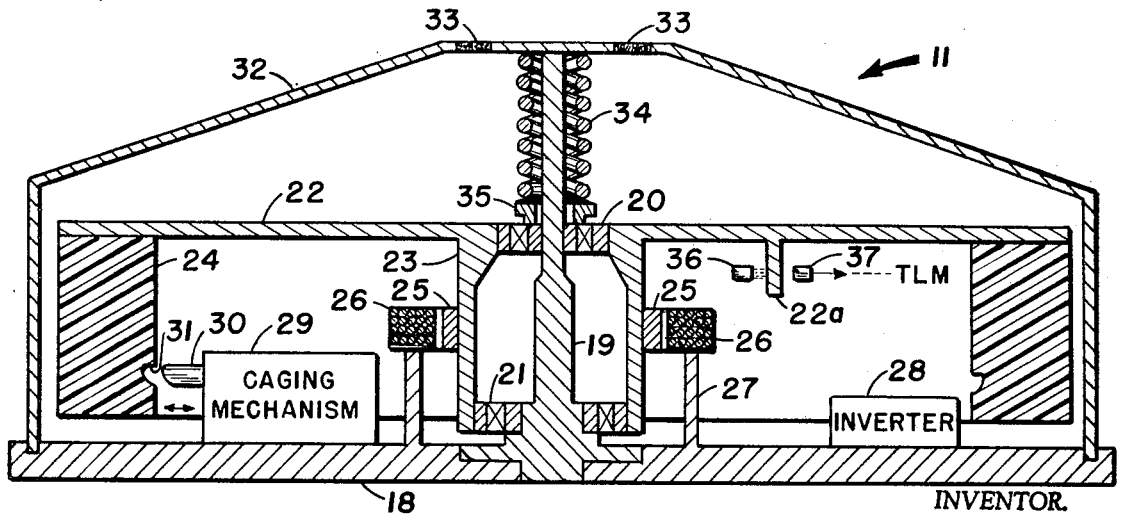
FIG. 2 is a simplified sectional view of one embodiment of the angular momentum flywheel utilized in the spin stabilization system of the present invention.

Obviously, the angular momentum flywheel or rotor 11 can be of any suitable structural configuration. One flywheel structure which has been utilized in practice is shown in FIG. 2 of the drawings. This illustrated flywheel structure 11 comprises a mounting plate member 18 which is rigidly secured within the spacecraft 10 so that angular momentum generated by the flywheel 11 contributes to the net angular momentum of the over-all spinning satellite/rotor system. Secured at the center of the mounting plate 18 is a suitable rotor shaft member 19 which is fitted with upper and lower bearings 20 and 21 respectively which, in turn, support the rotating member of the illustrated flywheel 11. More specifically, the rotating member of the flywheel 11 comprises a generally flat circular disc-like member 22 which is formed with a hollow central hub portion 23 adapted to encircle the fixed shaft 19 and be supported at bearings 20 and 21. Adjacent the outermost edge of circular member 22 is bonded an annular rim member 24 which preferably contains a substantial portion of the moment of inertia of the rotating portion of the flywheel 11. Moreover, the rim member 24 is preferably formed of a non-electrically conductive material in which no eddy currents will be generated. One example of a suitable material for the rim member 24 is the Fiberglas epoxy composition known in the trade as EPOGLAS.

The central hub portion 23 of the flywheel 11 carries a suitable armature 25; whereas, a stator winding assembly 26 is mounted upon a cup-shaped extension 27 of the mounting member 18 to surround the armature 25. The armature 25 comprises a single, continuous band of suitable magnetic material such as, for example 17 percent cobalt and 83 percent silicon steel. The stator assembly 26 is a conventionally wound two-phase stator assembly which, together with armature 25, forms a well-known hysteresis type synchronous A.C. motor. A suitable electrical inverter unit 28 of conventional design is also mounted on the mounting plate 18, as will be described in more detail hereinafter, converts the D.C. voltage supplied by the satellite power source into two square wave voltage signals which are displaced 90° in phase from one another and are utilized to energize the stator winding pair in assembly 26 and thereby spin the rotor at the desired speed and in the desired direction, as will be described in more detail hereinafter when discussing the control circuitry of FIG. 3. Also secured to the mounting plate 18 is a suitable caging mechanism 29 which might include, for example, the illustrated movable detent arm 30 which cooperates with recess 31 in the rim member 24 for the purpose of locking and unlocking the rotary member of the flywheel 11, as desired, for example during the satellite's launch phase.

A suitable dust cover 32 is provided for the operating mechanism of the flywheel 11, as shown in FIG. 2, and has a pair of filtered air vents 33 which permit air to flow out of the enclosure as the satellite launch rocket gains altitude. An axial load spring 34 is preferably disposed between the dust cover 32 and collar 35 at the upper surface of the bearing 20 in order to exert preload on the upper and lower bearings and thereby reduce bearing vibrations.

To monitor the rotation rate of the flywheel, if desired, a suitable photoelectric detecting system is provided in FIG. 2. More specifically, this rotation rate detecting system might comprise, for example, a light source 36 and light detector or photocell 37 between which a small subtending finger 22a from the disc 22 passes, once for each revolution of the rotor 11, to momentarily interrupt the light source 36. The output of photocell 37 could thus represent one telemetry (TLM) input to the receiver/transmitter unit 17 of FIG. 1.

The control circuit apparatus utilized in accordance with the present invention is represented generally at block 14 in FIG. 1 and is illustrated in more detail in FIG. 3 of the drawings. Much of this circuitry is identical to that utilized in the spin control system disclosed in the Ellis and Fischell U.S. Pat. No. 3,489,372. For example, an orthogonal set of three magnetometer sensors 38, 39 and 40 is disposed aboard the spacecraft 10 to measure the components of the Earth's magnetic field along the X, Y and Z axes respectively of the spacecraft. The Z axis corresponds with the spin axis 13 of the satellite 10; whereas, the X and Y axes are perpendicular to one another and lie in a plane normal to the Z or spin axis.

The outputs of the magnetometer sensors 38, 39 and 40 are connected to suitable magnetometer electronic circuitry designated as block 41, of well-known design, which produces three output signals designated $V_x$, $V_y$ and $V_z$ corresponding respectively to the magnitude of the magnetic field component detected by the associated magnetometer sensor. These three voltage signals are applied, over lines 42, as telemetry (TLM) inputs to the telemetry transmitter apparatus 17 (see FIG. 1) for transmission to the Earth control station(s). The magnetometer output voltage signals $V_x$ and $V_y$ are also applied, through switch 43 in its upper or illustrated position, to suitable amplifiers 44 and 45 respectively. The output of the amplifier 44 is connected, via reversing switch 46, across an electromagnetic coil designated as Y COIL in FIG. 3 which is aligned with the Y axis of the satellite 10 (the Z-axis being the spin axis); whereas, the output of the amplifier 45 is connected, via reversing switch 47, to the X COIL aligned with the satellite's X axis.

As is fully explained in U.S. Pat. No. 3,489,372, energization of the X and Y electromagnetic coils with the outputs from the magnetometer sensors 39 and 38 respectively, causes a magnetic dipole moment to be generated aboard the spacecraft which interacts with the Earth's magnetic field and produces a torque, in the XY plane, which because these two X and Y coils (as well as the illustrated Z COIL) are rigidly attached to the outer or main body of the spacecraft 10 causes the spacecraft to spin about its designated Z or spin axis 13. The reversing switches 46 and 47 are utilized to control the polarity of energization to the X and Y electromagnetic coils of FIG. 3 and thereby control the sense or direction of the torque produced on the outer body of the satellite; i.e., operation of the switches 46 and 47 correspond to a spin/despin control. As noted in FIG. 3, the output currents from the amplifiers 44 and 45 which are utilized to energize the Y and X electromagnetic coils, are also preferably monitored and applied, via lines 48, as telemetry TLM information for transmission to the Earth's control station(s).

It should be noted in FIG. 3 that the satellite's D.C. supply voltage to the magnetometer electronics 41 is supplied through a suitable main control power switch 49 and the amplifiers 44 and 45 receive their D.C. supply voltages through the series connected switch 50. The operation of these power control switches 49 and 50 is under the control of command switch control unit 15, as represented by the dotted lines in FIG. 3, so that the ground control station(s) can enable and disable the satellite spin/despin system, as desired.

Also receiving its D.C. control voltages through power control switch 49 is suitable control circuitry 51 for the Z COIL which is well-known in the art and is described in detail in the Ellis and Fischell U.S. Pat. No. 3,489,372. The circuitry 51 supplies a preselected energizing current through reversing switch 52 to the Z COIL, mounted in alignment with the spin or Z axis of the satellite 10, for the purpose of generating a magnetic dipole moment which interacts with the geomagnetic field to vary the attitude of the spin axis, as desired. By controlling both the time and the polarity of energization of the illustrated Z coil; for example, with a digital computer at the ground station(s), the spin axis 13 can be precessed to any desired attitude. Both the time and polarity of energization from the Z COIL can be monitored, as represented by the line 53 designated TLM.

As mentioned previously, the inverter unit 28 also receives the D.C. supply voltage through switch 49 and converts it to an A.C. voltage signal form for application to the stator winding assembly 26 (see FIG. 2) to rotate the movable portion of the flywheel 11. For example, in one practical application of the proposed spin stabilization system, the inverter 28 converts the D.C. supply voltage into a pair of square wave voltage signals which are displaced in phase by 90° from one another and which are applied to the two-phase winding pair of stator assembly 26. In order to accomplish control over the direction and speed or rate of rotation for the flywheel 11, a suitable control unit 54 is connected between the output of inverter 28 and the stator 26 of the flywheel. The unit 54 might, for example, provide flywheel rotation rate control by varying the frequency of the stator energizing voltages or, alternatively where large speed changes are necessary, by varying both the frequency and the magnitude of the stator voltages. The direction of flywheel rotation can, on the other hand, be controlled at unit 54 by merely reversing the phase relationship between the two stator voltages.

One slight difference between the spin/despin control circuitry illustrated in FIG. 3 and the control system described in U.S. Pat. No. 3,489,372 is the demagnetizer unit shown at block 55 which performs A.C. demagnetization of the satellite in orbit. This unit operates, for example, by sending a command to initiate a damped sine wave at a frequency of say 5 Hertz into the X and Y coils when the control switch 43 is commanded to its lower position assuming that demagnetizer enabling switch 56 has been closed. This will demagnetize any soft magnetic materials in the satellite 10 that may become magnetized during the launch phase or during in-orbit operations.

Having thus described the apparatus utilized in one practical application of the present invention, attention will now be turned to some theoretical considerations concerning the operation of the proposed spin stabilization system; e.g., with an angular momentum flywheel mounted such that its spin axis is parallel with the spin axis of a slowly spinning satellite. More specifically and as previously mentioned, many spacecraft require a specified and frequently quite low spin rate which is insufficient to generate an appreciable gyroscopic restoring moment. As a result, spin axis orientation can be easily disturbed by small disturbing torques such as those arising from the gravity-gradient, for example. By employing the angular momentum flywheel 11 with its axis of rotation parallel to the satellite spin or Z axis 13, the flywheel 11 can provide the required stabilizing angular momentum to maintain the desired orientation of the satellite spin axis even when the spacecraft itself is spinning at such a very low or even zero spin rate. More specifically, if, as shown in the drawings, the Z direction is designated as the spin axis direction of both the satellite 10 and the flywheel or rotor 11, then if

$I_z'$ = moment of inertia of rotor 11 about the Z axis, $I_z$ = moment of inertia of the satellite 10 (excluding rotor) about the Z axis, $I_x' = I_y'$ = moments of inertia of the rotor 11 about X and Y axes respectively, $I_x = I_y$ = moments of inertia of the satellite 10 (excluding rotor) about X and Y axes respectively, and if $I_z' + I_z = I_x' + I_x = I_y' + I_y$, there will be no gravity-gradient torques acting on the satellite body. But if $I_z' \omega_z' \gg I_z \omega_z$ where $\omega_z'$ = angular rate of the rotor 11
and $\omega_z$ = angular rate of the satellite 10, a net angular momentum will be produced which is essentially determined by the product $I_z' \omega_z'$. The satellite 10 will therefore be spin-stabilized about the Z axis, even though the satellite 10 is free to rotate at any small rotation rate without significantly affecting the over-all attitude stability.

As mentioned previously, the proposed spin stabilization system of the present invention; i.e., with an angular momenta flywheel mounted with its spin axis parallel to the spin axis of the spacecraft, can also be utilized on large spinning satellites or on those which are required to spin at a high rate, for the purpose of facilitating adjustment in the attitude of the satellite spin axis orientation while in orbit. For example, one method of varying satellite spin axis orientation involves the utilization of a chargeable magnet to precess the spin axis to a desired position. Obviously, if the satellite is quite large or is spinning at a relatively high rate, a significant amount of chargeable magnetic material is necessary in order to effect any appreciable adjustment in the spin axis orientation. If, however, there is a counter-rotating body rigidly attached to the spacecraft such as the flywheel 11, as proposed in accordance with the present invention, to reduce the net angular momentum of the system, it would then be possible to control spin axis orientation with a much smaller amount of chargeable magnetic material or at a much faster rate for the same weight of chargeable magnet. In this later application of the proposed spin stabilization system of the present invention, the net angular momentum of the system would always be maintained at a non-zero value in order to assure spin stabilization of the spacecraft.

Typical values of the control parameters for one practical application of the spin stabilization system of the present invention are listed below.

Moments of Inertia
a. For main body of the satellite
$I_{spin}$ = 30.4 kg/m²
$I_{transverse}$ = 27.9 kg/m²
b. For the angular momentum flywheel
$I_{spin}$ = 0.0115 kg/m²
$I_{transverse}$ = 0.00508 kg/m²

Nominal Angular Rates
a. For the main body of the satellite Typically 1/12 RPM but actually adjustable from 0 to ± 100 RPM
b. For the flywheel 2,000 RPM relative to the main body.

Angular Momenta
a. For the main body of the satellite $H_{sat}$ = 1.75 slug/ft²/RPM at 1/12 RPM
b. For the flywheel $H_w$ = 16.9 slug/ft²/RPM at 2,000 RPM Theoretical Nutation Angle Damping Time Constant
For the combined bodies, $\pi$ = 22 minutes Various modifications, adaptations and alterations of the present invention are of course possible in light of the above teachings. It should therefore be understood at this time that the invention defined by the appended claims may be practiced otherwise than as specifically described.

What is claimed is:

1. A gyroscopic spin stabilization system for a satellite comprising, in combination, spin/despin control means for spinning said satellite at a selected rate and in a selected direction about a predetermined spin axis and tending to spin stabilize said spin axis, and a substantially constant speed angular momentum flywheel mounted aboard said satellite such that the angular momenta of said flywheel and said spinning satellite add together to produce a net non-zero angular momentum, the angular momentum of said flywheel being effective to increase said net angular momentum to a value sufficient to gyroscopically stabilize the spin axis of said satellite in a desired attitude when the spin of said satellite is insufficient by itself to accomplish such spin stabilization.

2. The spin stabilization system as specified in claim 1 wherein the axis of rotation of said flywheel is parallel to the spin axis of said satellite.

3. The satellite spin stabilization system specified in claim 1 and further including nutation damper means mounted aboard said satellite for eliminating wobble of said satellite about said satellite spin axis.

4. The satellite spin stabilization system specified in claim 1 wherein said angular momentum flywheel includes a rotating rim member formed of a material in which no eddy currents are generated during rotation of said rim member.

5. The satellite spin stabilization system specified in claim 1 wherein said spin/despin control means comprises, in combination, means responsive to the geomagnetic field for producing a pair of output signals proportional to the geomagnetic field components that exist respectively along two perpendicular axes of said satellite in a plane normal to the spin axis of said satellite, a pair of electromagnets, one of which is mounted in alignment with each of said perpendicular satellite axes, and means connecting said signal producing means to said pair of electromagnets for energizing said electromagnets with said output signals to produce torque on said satellite effective to spin said satellite in a selected one of two opposite directions about said spin axis.

6. The spin stabilization system as specified in claim 1 further including control means for controlling the direction and rate of rotation for said flywheel whereby said net angular momentum is variable between first and second preselected limits, said first preselected limit being selected to have a value at which said flywheel generates an angular momentum effective to increase said net angular momentum to a value sufficient to stabilize the spin axis of said satellite in a desired attitude when the spin of said satellite is insufficient by itself to accomplish such spin stabilization, said second preselected limit being selected to have a value at which said flywheel generates an angular momentum effective to reduce said net angular momentum to a value at which the attitude of the spin axis of said satellite can be varied, and further including spin axis attitude control means for adjusting the attitude of the spin axis of said satellite as desired.

7. The satellite spin stabilization system specified in claim 6 wherein said spin axis attitude control means comprises, electromagnet means mounted in alignment with the spin axis of said satellite, and means for energizing said electromagnet means to produce a magnetic dipole moment parallel with said spin axis which interact with said geomagnetic field to precess said spin axis to a desired attitude.

8. The satellite spin stabilization system specified in claim 6 wherein the axis of rotation of said flywheel and the spin axis of said satellite are parallel, whereby the angular momentum of said flywheel is effective to add to the angular momentum of said satellite when said flywheel and said satellite are spinning in the same direction and to subtract from the angular momentum of said satellite when said flywheel and said satellite are spinning in opposite directions.

9. The satellite spin stabilization system specified in claim 8 wherein said flywheel includes, a rim member capable of rotating and defining a concentration of mass within said flywheel, said rim member being formed of a material in which no eddy currents are generated during rotation of said rim member, and caging means for locking and unlocking said rotatable rim member, as desired.

10. The satellite spin stabilization system specified in claim 9 further including nutation damper means mounted aboard said satellite for eliminating wobble of said satellite about said satellite spin axis.

* * * * *